United States Patent [19]

Tamura et al.

[11] Patent Number: 4,933,559

[45] Date of Patent: Jun. 12, 1990

[54] PYROELECTRIC INFRARED SENSOR

[75] Inventors: Yukitoshi Tamura, Sakura; Kenji Hirahara, Ichikawa, both of Japan

[73] Assignee: Sumitomo Metal Mining Co., Ltd., Tokyo, Japan

[21] Appl. No.: 283,326

[22] PCT Filed: May 27, 1988

[86] PCT No.: PCT/JP88/00511

§ 371 Date: Nov. 29, 1988

§ 102(e) Date: Nov. 29, 1988

[87] PCT Pub. No.: WO88/09486

PCT Pub. Date: Dec. 1, 1988

[30] Foreign Application Priority Data

May 29, 1987 [JP] Japan .................................. 62-82715

[51] Int. Cl.$^5$ ............................................. G01J 5/22
[52] U.S. Cl. ............................... 250/338.3; 250/338.1
[58] Field of Search ........................ 250/338.3, 338.1

[56] References Cited

U.S. PATENT DOCUMENTS 4,626,687 12/1986 Nara et al. .................... 250/338.3
4,827,133 5/1989 Zierhut ......................... 250/338.4

FOREIGN PATENT DOCUMENTS 55-131733 10/1980 Japan ........................... 250/338.3

Primary Examiner—Constantine Hannaher
Attorney, Agent, or Firm—Spensley Horn Jubas & Lubitz

[57] ABSTRACT

A pyroelectric infrared sensor composed of at least a pyroelectric element and an FET whose gate is connected to one electrode of the pyroelectric element which are housed in the same package, and a capacitor connected between a source of the FET and a ground connected to the other electrode of the pyroelectric element, and used as a system for amplifying and utilizing an output, which is very weak, through a high gain amplifier. The pyroelectric infrared sensor is provided with a high-frequency noise attenuation element 8 between the source S of the FET 2 and the capacitor 6 so that the high-frequency noise attenuation element 8 is housed in the same package 4 as the pyroelectric element 1 and the FET 2, and the capacitor 6 is disposed on the outside of the package 4. The high-frequency noise attenuation element is shielded so that a tendency for the element to turn to an antenna is prevented and a function for eliminating an antenna effect is exercised in virtue of the capacitor.

4 Claims, 3 Drawing Sheets

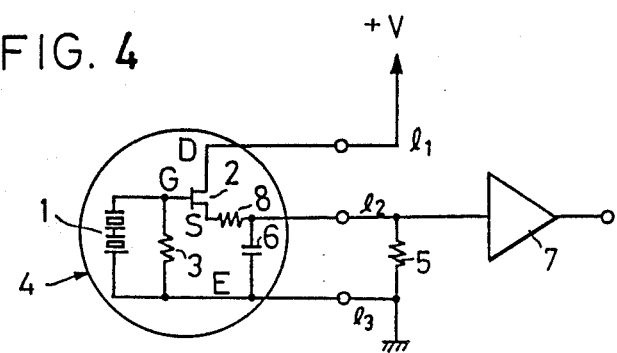
FIG. 4
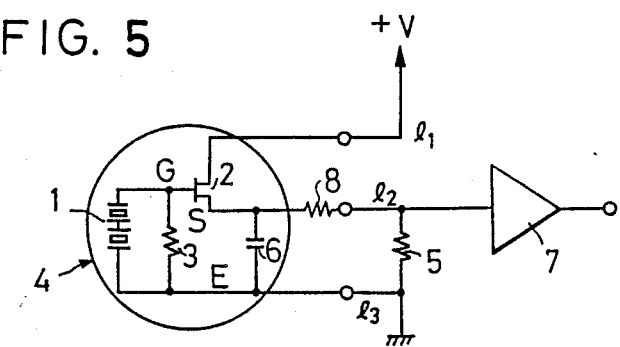
FIG. 5
FIG. 6
PRIOR ART
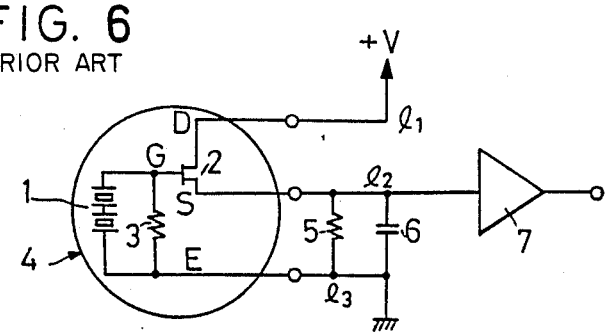

PYROELECTRIC INFRARED SENSOR

TECHNICAL FIELD

The present invention relstes to a pyroelectric infrared sensor composed of at least a pyroelectric element and an FET whose gate is connected to one electrode of the pyroelectric element which are incorporated in the same package and a capacitor connected between a source of the FET and a ground connected to the other electrode of the pyroelectric element.

BACKGROUND ART

In recent years, apparatus having electromagnetic wave generation sources, not to speak of radio transmitters and high-frequency therapeutic apparatus, have increased in utilization and the malfunction of a pyroelectric infrared sensor which is caused by electromagnetic wave noise generated from those apparatus has been taken up as a tough problem. Specifically, the pyroelectric infrared sensor, having a very weak output, is commonly used by amplifying the output through a high gain amplifier and consequently is liable to be affected by the noise. In addition to this, a problem has been encountered that, since input impedance to the amplifier turns extremely high, a part provided on the input side thereof behaves easily as an antenna and, as a result, the malfunction caused by the electromagnetic wave noise is liable to be generated.

FIG. 6 is a circuit diagram showing a conventional pyroelectric infrared sensor and an amplification circuit connected thereto. Reference numeral 1 denotes a dual type pyroelectric element, 2 an FET for impedance transposition, whose gate G is connected to one electrode of the pyroelectric element 1, and 3 a leakage resistance connected between the gate G of the FET 2 and a ground E connected to the other electrode of the pyroelectric element 1 and preventing the gate of the FET 2 from being saturated in the case where an excessive input is caused. These components are housed in the same package 4 to construct the pyroelectric infrared sensor. Reference symbols $l_1$, $l_2$, $l_3$ denote output lead-in wires connected to a drain D and a source S of the FET 2 and the ground E, respectively. Further, reference numeral 5 denotes an output load resistance for fetching an output signal from the source S, connected between the output lead-in wires $l_2$ and $l_3$, 6 a noise out capacitor for high-frequency noise leakage, likewise connected between the output lead-in wires $l_2$ and $l_3$, and 7 a high gain amplifier connected to the output lead-in wire 2. These components configure the amplification circuit.

In the conventional pyroelectric infrared sensor constructed as described above, although attempts have been made to cut the electromagnetic wave noise which is high-frequency noise, by means of the capacitor 6 provided outside, there has been a problem that the noise cannot completely be cut only by the capacitor 6. Specifically, in FIG. 6, when a noise voltage inputted to the connection between the output lead-in wire $l_2$ and the capacitor 6 is represented by Nv, the impedance of the capacitor 6 by Z, and the resistance of the output lead-in wire $l_2$ by R, a noise voltage Nv' outputted from the connection is expressed by $$Nv' = \frac{Z}{R + Z} Nv \qquad (1)$$

Here, although, if the frequency of the noise voltage Nv turns high, the impedance is reduced, Nv' ≈ Nv due to R ≈ 0 and the noise is not completely cut.

Further, the invasion of the electromagnetic wave noise is made through routes such as the lead-in wires, $l_1$, $l_2$ and a window $4a'$ formed of silicon, and attempts have also been made to prevent the noise invasion for each route. These attempts are such that, for example, a filter for preventing the noise invasion is provided for each lead-in wire and a netted member comprising a good electric conductor is attached to the window $4a'$ formed of silicon. Such manners, however, make it difficult to bring about an effect sufficient for preventing the malfunction on all the routes of the noise invasion and may cause problems that the increase of the number of parts incurs cost increase, large-sizing of apparatus, and reduction of sensitivity.

Also, even if a filter sufficient to absorb the electromagnetic wave noise can be constructed, it may turn to an antenna of the electromagnetic wave in the case where the filter is positioned on the outside of the package 4, that is, where it is in a non-shield state, so that a problem arises that a noise attenuation effect is small. In addition, although attempts have been made to incorporate the sensor and the amplification circuit in the same package and thereby to eliminate the invasion of the electromagnetic wave noise, it is difficult to make a complete shield because the package needs an incident window for infrared rays. As a result, the use of a large-sized package brings about problems of the large-sizing of the sensor and the increase of manufacturing costs.

The present invention, therefore, is to provide a pyroelecteic infrared sensor which can prevent any malfunction resulting from the electromagnetic wave noise without causing the problems of the large-sizing of the sensor and the increase of manufacturing costs.

DISCLOSURE OF INVENTION

The present invention finds out that the electromagnetic wave noise is outputted only from the source of the FET, and is intended to attenuate completely, in this step, the noise which enters from all the invasion routes.

That is, the present invention is designed to be provided with a high-frequency noise attenuation element between the source of the EFT and the capacitor, incorporate the high-frequency noise attenuation element in the same package as the pyroelectric element and the FET, and place the capacitor on the outside of the package and thereby it has been found out that a tendency for the high-frequency noise attenuation element to turn to an antenna is arrested so that a sufficient effect of attenuation on the high-frequency noise is achieved by an associated behavior of the high-frequency noise attenuation element with the capacitor and that a function that an antenna effect of the output lead-in wire is eliminated by the capacitor brings about a complete effect of noise attenuation.

Here, where the high-frequency noise attenuation element is provided on the outside of the package, the high-frequency noise attenuation element turns to an antenna and, as a result, a complete effect of noise attenuation is not achieved. On the other hand, where the capacitor, eliminating the antenna effect of the output lead-in wire, is provided on the outside of the package, a higher effect of noise attenuation is brought about. Also, if the order of connection of the high-frequency noise attenuation element with the capacitor is different from that described above, regarding the source of the FET, the high-frequency noise attenuation effect is not obtained.

BRIEF DESCRIPTION OF DRAWINGS

FIG. 4 is a circuit diagram showing a first comparison example and the amplification circuit connected thereto;

FIG. 5 is a circuit diagram showing a second comparison example and the amplification circuit connected thereto; and FIG. 6 is a circuit diagram showing a conventional example and the amplification circuit connected thereto.

BEST MODE FOR CARRYING OUT THE INVENTION

Figure 1:
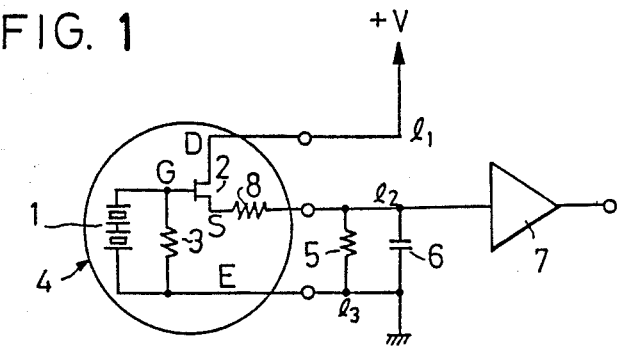
FIG. 1 is a circuit diagram showing an embodiment of a pyroelectric infrared sensor according to the present invention and an amplification circuit connected thereto.

In accordance with an embodiment shown in the drawings, the present invention will be described in detail below, with like reference numerals and symbols used to designate the members employed in the above conventional example.

In FIG. 1, reference numeral 8 represents a resistance for high-frequency noise attenuation connected in series to the source S of the FET and housed in the package 4, whose direct-current resistance value is assumed to be set within the range of $0.1\Omega \sim 10$ K$\Omega$ in view of properties of both noise attenuation and sensitivity. Further, reference numeral 6 represents a capacitor conneted to the source S of the FET 2 through the resistance 8 at one end thereof and to the ground E at the other end and disposed on the outside of the package 4, which is identical with the conventional noise cut capacitor 6 in function and whose capacity value is assumed to be set with the range of 1 pF$\sim$0.1 $\mu$F. In such a case, therefore, the conventional amplification circuit can be used as it is.

Figure 2:
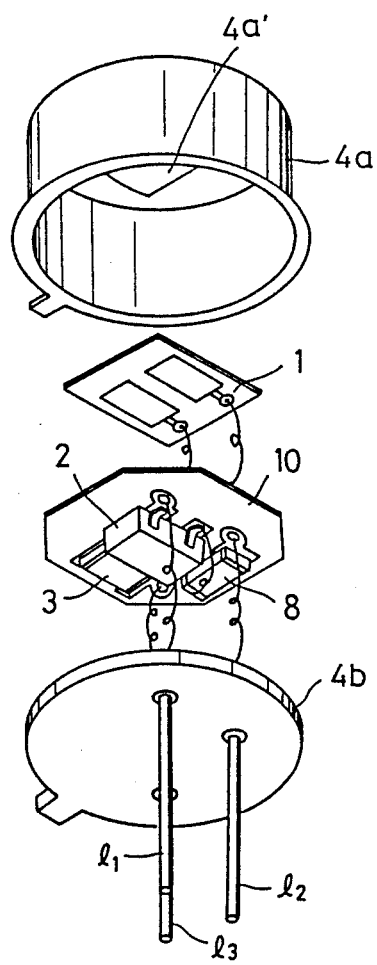
FIG. 2 is an exploded perspective view of the above embodiment.

FIG. 2 is an exploded perspective view of the preceding embodiment, which is constructed so that the pyroelectric element 1, the FET 2, and the resistances 3, 8 are fixed onto an aluminum base plate 10 and housed for shield in the package 4, which is, for example, of Model TO-5, comprising a cap 4a provided with the window 4a' formed of silicon and a stem 4b closely fitted thereinto. Further, the resistance 5 and the capacitor 6 are connected, though not shown in the illustration, between the lead-in wires $l_2$ and $l_3$ after the sensor of the present invention is equipped on a printed circuit board. Also, the wiring among individual elements may be performed by using either of a thick-film printing technique or a lead-in wire.

The pyroelectric infrared sensor according to the present invention is constructed as described above, so that an attenuation effect sufficient for the high-frequency noise is brought about by an associated behavior of the resistance 8 with the capacitor 6. Specifically, in formula (1) stated above, when the resistance value of the resistance 8 is represented by R, the impedance of the capacitor 6 by Z, and the frequency of the noise voltage Nv becomes high, the impedance $\overset{.}{Z}$ is reduced to a small value and conversely the resistance value R becomes large. Thus, Nv'$\simeq$0 and the noise is completely cut. In fact, it was confirmed that the noise could completely be attenuated in regard to the electromagnetic wave with the frequencies of 2 GHz or less. Also with respect to the electromagnetic wave of more than 2 GHz, the noise attenuation was effective to an appreciable extent. Here, it is of importance that the resistance 8 is accommodated in the package 4 in addition to the pyroelectric element 1 and the FET 2 and the capacitor 6 is placed on the outside of the package 4. Except for such an arrangement, a complete effect of attenuation cannot be secured with respect to the electromagnetic wave noise outputted from the source S of the FET. By way of example, where the resistance 8 is provided on the outside of the package 4, a complete effect of noise attenuation is not brought about because a shield effect is insufficient, namely, the resistance 8 turns to an antenna. Further, although the capacitor 6 has a function for eliminating an antenna effect of the lead-in wire $l_3$, the function is not sufficiently exercised where the capacitor 6 is disposed in the package 4. In addition, where the resistance 8 is disposed between the capacitor 6 and the lead-in wire $l_2$, R $\simeq$0 in formula (1) viewed from the side of the source S of the FET 2, with the result that Nv$\simeq$Nv and the noise is not adequately cut. Accordingly, when the arrangement is made as in the embodiment of the present invention, the electromagnetic wave noise is adequately can attenuated and the malfunction caused by the electromagnetic wave noise can securely be obviated. Furthermore, the amplification circuit is not substantially included in the package 4, so that the large-sizing of the sensor and the raise of manufacturing costs are not brought about.

Figure 3:
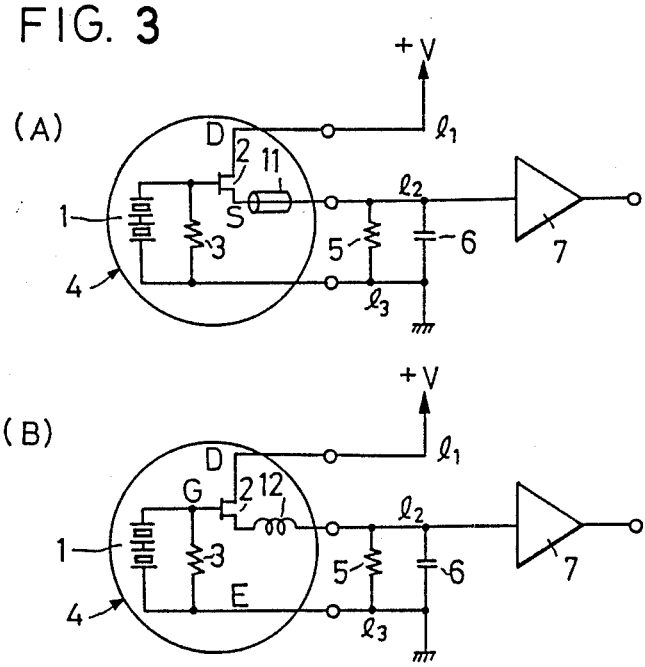
FIG. 3(A) and 3(B) are circuit diagrams showing modification examples of the embodiment and amplification circuits connected thereto.

FIGS. 3(A) and 3(b) show modification examples of the embodiment described above and amplification circuits connected thereto. FIG. 3 ( A ) shows an example in the use of a core 11, made of ferrite or amorphous materials, for high-frequency noise attenuation in which impedance is set within the range of at least 0.1$\Omega \sim$10 K$\Omega$ at the frequency of 1 MHz $\sim$2 GHz, instead of the resistance 8, and FIG. 3 ( B ) depicts an example in the use of an inductor 12 for high-frequency noise attenuation in which self-inductance is set within the range of at least 0.1 $\mu$H$\sim$10 mH at the frequency of 1 MHz $\sim$2 GHz, instead of the resistance 8.

Also, the resistance 8, the core 11, and the inductor 12 may be formed by any way of lead-in wires, chip parts, thick film printing, plating, vacum evaporation, and sputtering.

Further, in examples shown in FIGS. 1 and 3(A) and (B), since the noise invasion is liable to be made if the capacitor 6 is unnecessarily distant from the sensor, it is desirable that the capacitor 6 is disposed as close to the sensor as possible.

Next, an experimental example will be mentioned below.

The embodiment depicted in FIG. 1 was used as the sensor of the present invention. For a first comparison example, the arrangement was applied that the capacitor 6 was housed in the package 4 as shown in FIG. 4, Further, for a second comparison example, the arrangement was employed that, in contrast with the case of the present invention, the capacitor 6 was provided in the package 4 and the resistance 8 was placed on the outside thereof as shown in FIG. 5. In the sensor of the present invention, the first comparison example, and the second comparison example, a chip resistance of 1 KΩ was used as the resistance 8, a chip resistance of 47 KΩ as the output load resistance 5, a chip ceramic capacitor of 0.01μF as the capacitor 6, an amplification degree of 60 dB and a band width of 0.5~5 Hz as the high gain amplifier 7, and a wireless device of CLARION (registered trademark) JC9 JC900 JB5W 900 MHz and an antenna of MASPRO (registered trademark) Personal wireless Mobiletener P3S 3dB as an electromagnetic wave generation source, to make comparisons between amplification outputs in the cases where a distance from the sensor to the antenna is 20 mm and where the conventional sensor is employed on the same condition. The results are as shown in the following table.

TABLE

|  | Noise output (mVp-p) |
|---|---|
| Conventional Sensor | 455 |
| Present invention sensor | 35 |
| First comparison example | 210 |
| Second comparison example | 460 |

As will be evident from the above results, the noise signal is not adequately attenuated in the case of the conventional sensor although the noise cut capacitor 6 is outside provided, while on the other hand, the noise value of the sensor of the present invention is reduced to approximately 1/13 of that of the conventional sensor. Further, the noise signal in the first comparison example, although attenuated in some extent, is still insufficient in attenuation and, in the second comparison example, the noise signal is not adequately attenuated as in the case of the conventional sensor.

Also, there is a difference between the above experimental value of the present invention and the theoretical value derived from formula (1). This reason is that the wiring including the lead-in wire $l_2$ interposed between the source S of the FET 2 and the capacitor 6 disposed outside has a resistance component and an inductance component, although at a minimum, and the capacitor 6 has a direct-current resistance component.

INDUSTRIAL APPLICABILITY

As stated above, the pyroelectric infrared sensor according to the present invention is useful for invasion alarms, body detectors for an automatic door, detectors for a visitor, radiation thermometers, etc. and is peculiarly suitable for such a system that it is necessary in use to amplify an output, which is extremely weak, through the high gain amplifier.

We claim:

1. A pyroelectric infrared sensor comprising at least a pyroelectric element and an FET whose gate is connected to one electrode of the pyroelectric element which are housed in the same package, and a capacitor connected between a source of the FET and a ground connected to the other electrode of the pyroelectric element, wherein a high-frequency noise attenuation element is provided between the source of the FET and the capacitor so that said high-frequency noise attenuation element is housed in the package and said capacitor is disposed on the outside of the package.

2. A pyroelectric infrared sensor according to claim 1, wherein said high-frequency noise attenuation element is a resistance.

3. A pyroelectric infrared sensor according to claim 1, wherein said high-frequency noise attenuation element is a core made of ferrite or amorphous materials.

4. A pyroelectric infrared sensor according to claim 1, wherein said high-frequency noise attenuation element is an inductor.

* * * * *